United States Patent [19]
Riches, Jr. et al.

[11] Patent Number: 5,490,265
[45] Date of Patent: Feb. 6, 1996

[54] LATE CANCEL METHOD AND APPARATUS FOR A HIGH PERFORMANCE MICROPROCESSOR SYSTEM

[75] Inventors: Robert M. Riches, Jr., Hillsboro; Phillip G. Lee, Aloha; Truong Nguyen, Beaverton, all of Oreg.

[73] Assignee: Intel Corporation, Santa Clara, Calif.

[21] Appl. No.: 46,630

[22] Filed: Apr. 14, 1993

[51] Int. Cl.$^6$ .................................................. G06F 13/00
[52] U.S. Cl. .......................... 395/496; 395/467; 395/495; 364/231.8; 364/262.4; 364/281.4; 364/296.24; 364/964.26; 364/DIG. 1; 364/DIG. 2
[58] Field of Search ..................................... 395/467, 495, 395/496; 364/231.8, 262.4, 281.4, 964.24, 964.26

[56] References Cited

U.S. PATENT DOCUMENTS

| | | | |
|---|---|---|---|
| H1,291 | 2/1994 | Hinton et al. | 395/800 |
| 4,991,078 | 2/1991 | Wilhelm et al. | 395/375 |
| 5,136,696 | 8/1992 | Beckwith et al. | 395/375 |
| 5,287,467 | 2/1994 | Blaner et al. | 395/375 |
| 5,345,576 | 9/1994 | Lee et al. | 395/425 |
| 5,390,355 | 2/1995 | Horst | 395/800 |

*Primary Examiner*—Tod R. Swann
*Assistant Examiner*—Frank J. Asta
*Attorney, Agent, or Firm*—Blakely, Sokoloff, Taylor & Zafman

[57] ABSTRACT

A late cancel method and apparatus for a high performance microprocessor system is disclosed. The invention is advantageously utilized in a microprocessor system comprising a processor, an external cache memory and a main memory. The processor incorporates logic to determine whether an access directed to the external cache memory has resulted in a cache hit or miss. In operation, the processor requests a desired instruction from the external cache memory which provides a cache word and cache tag to the processor before a validity determination has been made. The processor determines whether the instruction is valid, while concurrently, the processor begins to pre-decode and decode the cache word as an instruction. If the processor determines that a cache hit has occurred, the cache word proceeds normally through decoding to execution by the processor. Alternatively, if the processor determines that a cache miss has occurred, the cache word is canceled such that the results of any pre-decoding or decoding are eliminated from the processor pipeline, and the instruction is not executed. The processor further halts the processor pipeline and obtains the desired instruction from main memory.

18 Claims, 7 Drawing Sheets

LATE CANCEL METHOD AND APPARATUS FOR A HIGH PERFORMANCE MICROPROCESSOR SYSTEM

BACKGROUND OF THE INVENTION

1. Field of the Invention

The present invention relates to microprocessor systems, and more particularly, to a late cancel method and apparatus for a high performance microprocessor system with a backside cache memory.

2. Art Background

In order to avoid frequent, cycle consuming accesses of main memory, a microprocessor system frequently utilizes a cache memory. A cache memory is typically comprised of a relatively small amount of static random access memory (SRAM) which is both physically faster than main memory and arranged such that it can be addressed more rapidly than main memory. The microprocessor within the system then uses the faster cache memory to capture and store processor information (e.g. instructions or data) as they are used. Once this information is stored in the cache memory, the microprocessor is able to quickly and advantageously access it in cache memory rather than in main memory. The intelligent use of a cache memory can substantially enhance the performance of the overall microprocessor system.

Cache memories are organized and utilized in accordance with predetermined mapping policies, including for example, direct mapped, associative mapped, or set associative mapped policies. In the case of a direct mapped cache memory, for example, several blocks of main memory map directly to the same particular cache line in the cache memory. Of all the main memory blocks that map into a particular cache line in the cache memory, however, only one can actually reside in that cache line at one time.

When a microprocessor requests an instruction or data from a cache memory, the request can either result in a cache hit or a cache miss. A cache hit corresponds to the situation wherein the particular instruction or data requested by the microprocessor is presently stored in the cache memory. On the other hand, a cache miss corresponds to the situation wherein the particular instruction or data requested by the microprocessor is not presently stored in the cache memory. It will be appreciated that in the aforementioned direct mapped cache memory, a cache miss might correspond to a situation wherein the relevant cache line contains data or an instruction from a different memory block also mapped to this cache line. Under such circumstances, the data or instruction in the relevant cache line is "invalid" for purposes of the request, and a cache miss results. In the event of a cache miss, the microprocessor necessarily obtains the desired data or instruction from main memory.

In prior art systems, a microprocessor requesting an instruction from an external cache memory would first couple a request to the external cache memory for the desired instruction, wait until the external cache memory indicated a cache hit or miss, then, in the event of a cache hit, place the cache word provided by the external cache memory into the processor pipeline to be executed. In essence, the microprocessor would wait until the validity of the instruction was established (i.e. a cache hit) before processing the instruction. As will be described, the present invention provides for a microprocessor late cancel method and apparatus wherein a microprocessor requesting an instruction from cache memory does not wait until a cache hit or miss determination has been made before using the cache word provided by the cache memory. Instead, the cache word is placed in the processor pipeline immediately, before validity has been established. If the cache word is found to be invalid, it is canceled through a late cancel mechanism, prior to execution.

SUMMARY OF THE INVENTION

The present invention finds application in the area of microprocessor systems, and more particularly, to a late cancel method and apparatus. The present invention is advantageously utilized in a microprocessor system comprising a processor, an external backside cache memory coupled to the processor with a backside bus, and a main memory coupled to the processor. In accordance with the present invention, the processor incorporates cache hit or miss logic to determine whether an access directed to the backside cache memory has resulted in a hit or miss of the backside cache memory.

In accordance with the method of operation of the present invention, the processor initially couples a request for a desired instruction to the backside cache memory. In response, the backside cache memory transfers a cache word and cache tag to the processor before any validity determination has been made. The processor provides the cache tag to the cache hit or miss logic in the processor, while, concurrently, the processor begins to process the cache word as an instruction. Accordingly, the processor begins to pre-decode and decode the cache word while the cache hit or miss logic determines whether a cache hit or miss has occurred.

If the cache hit or miss logic determines that a cache hit has occurred, the cache word proceeds through decoding to execution by the processor. If, on the other hand, the cache hit or miss logic determines that a cache miss has occurred, a "late cancel" occurs. In particular, the cache word is canceled such that the results of any pre-decoding or decoding are eliminated from the processor pipeline, and the instruction is not executed. The processor further halts the processor pipeline and couples a request for the desired instruction to main memory. In response, the desired instruction is obtained from main memory and coupled to the processor. The desired instruction is then pre-decoded, decoded, and executed by the processor.

Thus, by determining whether a cache hit or miss has occurred and concurrently initiating the pre-decoding and decoding of a cache word, the present invention enhances processor performance. In particular, the present invention eliminates the time formerly lost to waiting for a cache hit or miss determination before initiating the processing of an instruction provided to a processor from an external cache memory. In the few cases where the cache word is found to be invalid (a cache miss), in accordance with the present invention, the processor cancels the effects of the instruction in the processor, thereby maintaining correct program execution in all cases, and obtains the desired instruction from main memory.

BRIEF DESCRIPTION OF THE DRAWINGS

Further details are explained below with the help of the examples illustrated in the attached drawings in which.

DETAILED DESCRIPTION OF THE INVENTION

A late cancel method and apparatus for a high performance microprocessor system is described. In the following description, for purposes of explanation, numerous details are set forth in order to provide a thorough understanding of the present invention. However, it will be apparent to one skilled in the art that such specific details are not essential to the practice of the present invention. In other instances, in a number of figures, well known electrical structures and circuits are shown in block diagram form in order not to obscure the present invention unnecessarily.

Figure 1:
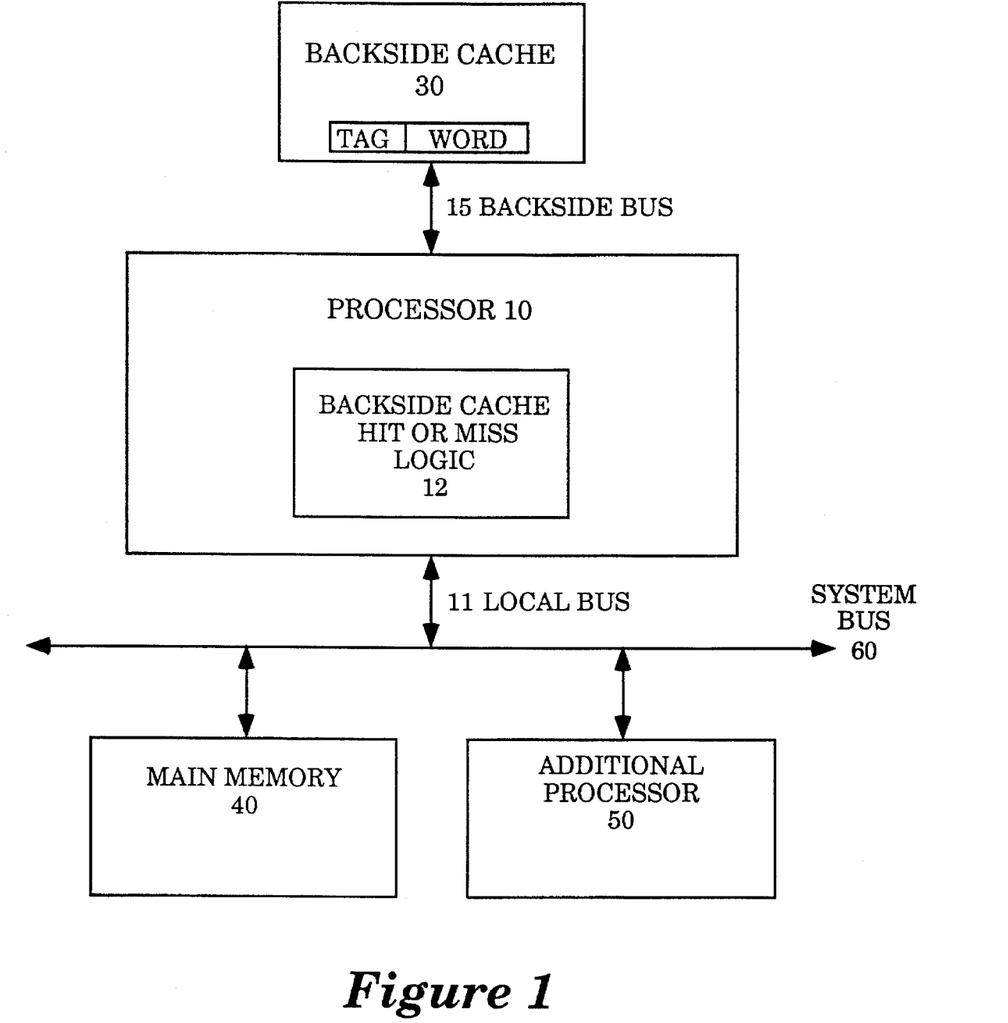
FIG. 1 illustrates a microprocessor system in which the present invention can advantageously be utilized.

Referring now to FIG. 1, this figure illustrates, in block diagram form, a microprocessor system in which the present invention can be advantageously utilized. This system includes a processor 10 disposed, for example, upon a single chip, an external backside cache memory 30, a main memory 40, and a system bus 60. As shown, the processor 10 is coupled to the backside cache memory 30 with a backside cache bus 15 and coupled to the system bus 60 with a local bus 11. The bandwidth of the backside cache bus 15 is advantageously optimized to facilitate the rapid passage of information between the processor 10 and the backside cache memory 30.

Coupled to the system bus 60 are main memory 40, comprised of, for example, DRAM, and an additional processor 50. The additional processor 50 is not necessary to the implementation of the present invention, but is included in FIG. 1 to indicate that system bus 60 can be structured such that it provides for a multiprocessor environment. Within such a multiprocessor environment, it will be appreciated, access to the system bus 60 would have to be arbitrated. Within such a multiprocessor system, the bandwidth of backside cache bus 15 will likely be greater than the per-processor bandwidth of local bus 11.

As shown in FIG. 1, in accordance with the present invention, processor 10 incorporates backside cache hit or miss logic 12. Backside cache hit or miss logic 12 determines whether a request by processor 10 to the backside cache memory 30 for an instruction results in a cache hit or cache miss. Thus, it will be appreciated that in the system shown in FIG. 1, instead of the backside cache hit or miss logic 12 being incorporated in the backside cache memory 30, this logic is incorporated in the processor 10. Accordingly, the hit or miss determination is made internally within processor 10 with backside cache hit or miss logic 12, using, for example, a tag comparison circuit.

With backside cache hit or miss logic 12 disposed within processor 10, the backside cache memory 30 can advantageously comprise low cost, commodity static random access memory (SRAM). The backside cache memory 30 can, for example, comprise a one or two bank, direct mapped, non-interleaved cache memory. Processor 10 then utilizes the direct mapped, backside cache memory 30 as an external, second level instruction cache. (The internal, first level instruction cache is not shown in this figure). Each cache line in backside memory 30 advantageously includes a tag, and a word comprising, for example, a processor instruction.

Figure 2:
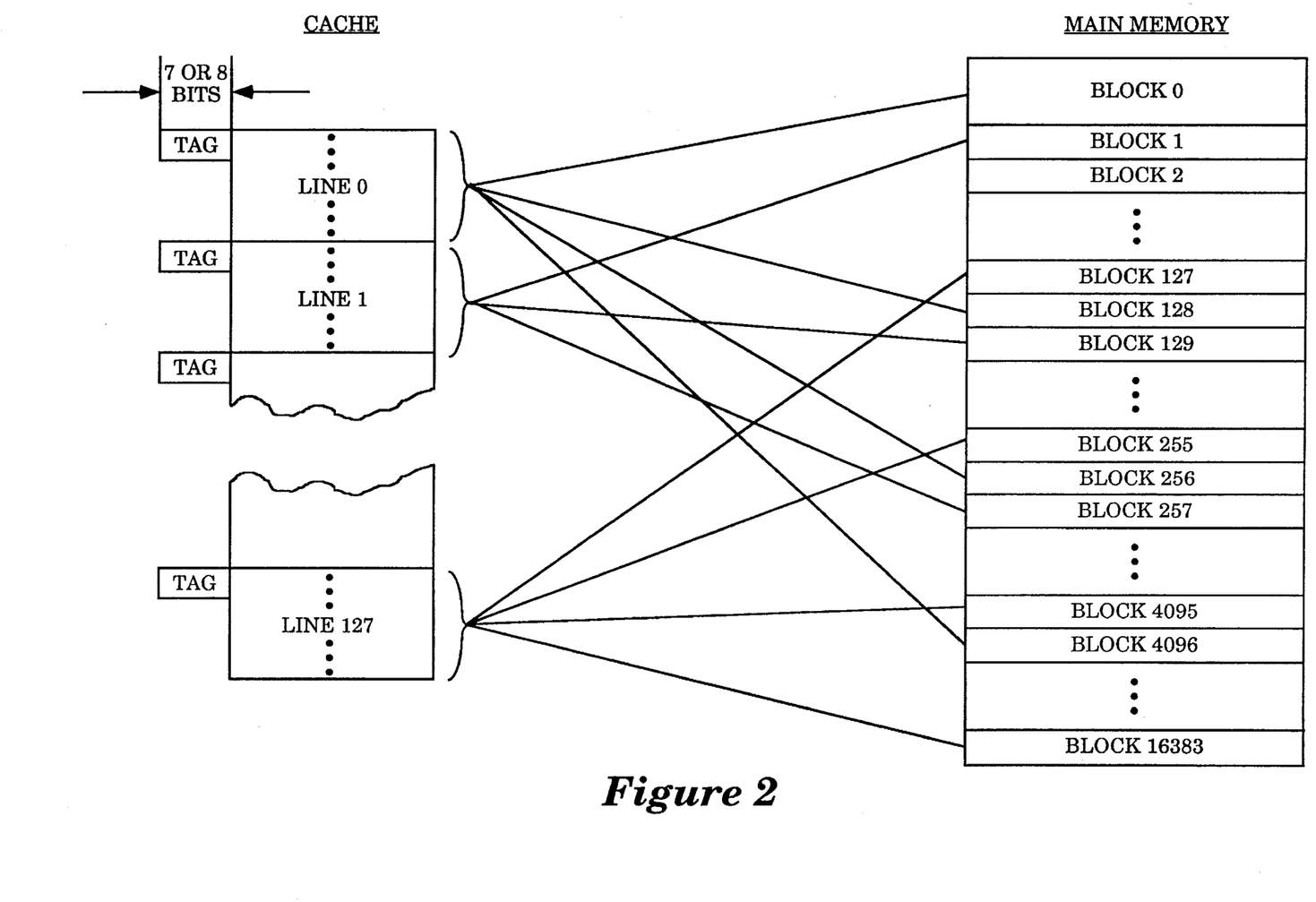
FIG. 2 illustrates a simple example of a direct mapped cache wherein particular blocks from main memory are mapped directly to particular cache lines.

Referring briefly to FIG. 2, this figure illustrates, in a simplified form, the basic placement policies behind a direct mapped cache, and beyond this pedagogical purpose, should not be taken in any way as a limitation upon the present invention. In the direct mapped cache shown in FIG. 2, the cache memory is of a size 2 K, with 16 words per cache line. Thus, the cache has 128 cache lines. The main memory shown has a capacity of 256 K words, or 16,384 blocks, with a physical address representable in 18 bits. In accordance with a direct mapping policy, a block of the main memory will map into the cache line x modulo 128 of the cache memory. Thus, as shown in this figure, several blocks from main memory will necessarily map to the same particular cache line in the cache memory. Of all the main memory blocks that map into a single cache line in the cache memory, it will be appreciated, only one can actually reside in the cache memory at one time.

Figure 3:
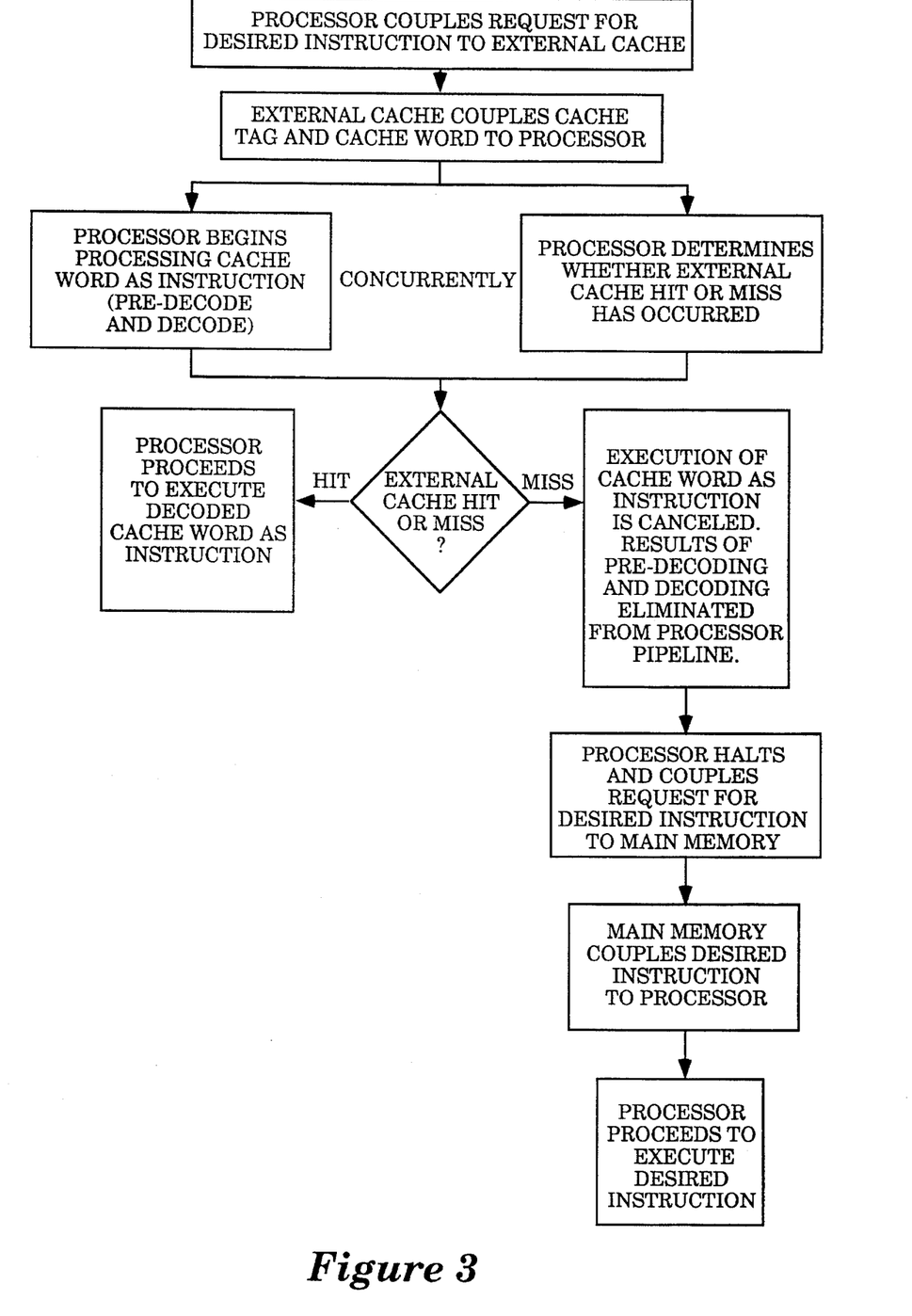
FIG. 3 illustrates, in flow chart form, the basic method of operation of the present invention.

With reference now to FIG. 3, this figure describes, in flow chart form, the basic method of operation of the present invention. With reference now to both FIGS. 1 and 3, this method of operation will be described. Initially, the processor 10 couples a request for a desired instruction to the backside cache memory 30. This request specifies a particular cache line within the cache to which the desired instruction is mapped. In response to this request, the backside cache memory 30 transfers a cache word and cache tag from the particular cache line to the processor 10. (It will be appreciated from the preceding discussion that this cache word may, or may not be valid, i.e. a cache hit). The processor 10 then couples the cache tag to the hit or miss logic 12, and concurrently, begins to process the cache word. Accordingly, the processor begins the instruction pre-decode and decode of the cache word, while the backside cache hit or miss logic 12 determines whether a cache hit or cache miss has occurred. The concurrency of these two steps is indicated in FIG. 3 through the use of a line and the term "concurrently" connecting these two steps.

If backside cache hit or miss logic 12 determines that a cache hit has occurred, the cache word (a valid instruction) proceeds normally through decoding to execution by the processor. If, on the other hand, backside cache hit or miss logic 12 determines that a cache miss has occurred, hat is termed a "late cancel" occurs. Namely, the cache word (an invalid instruction) is canceled such that the results of any pre-decoding or decoding are eliminated from the processor pipeline, and the instruction is not executed. The processor 10 further halts the processor pipeline and couples a request for the desired instruction to main memory 40. In response, the desired instruction is obtained from main memory 40 and coupled from main memory 40 to processor 10. The desired instruction, necessarily valid, is then pre-decoded, decoded, and executed by processor 10.

It will be appreciated from the foregoing description that the present invention eliminates the time formerly lost to waiting for a cache hit or miss determination before initiating the processing of an instruction provided to a processor from an external cache memory. Instead, the present invention allows a processor to start pre-decoding and decoding an instruction immediately, before a determination as to validity has been made. With cache hit rates typically above 80% in most programming contexts, this approach will provide enhanced processor performance. In the few cases where the instruction is found to be invalid, in accordance with the present invention, the processor cancels the effects of the instruction in the processor, thereby maintaining correct program execution in all cases.

Figure 4:
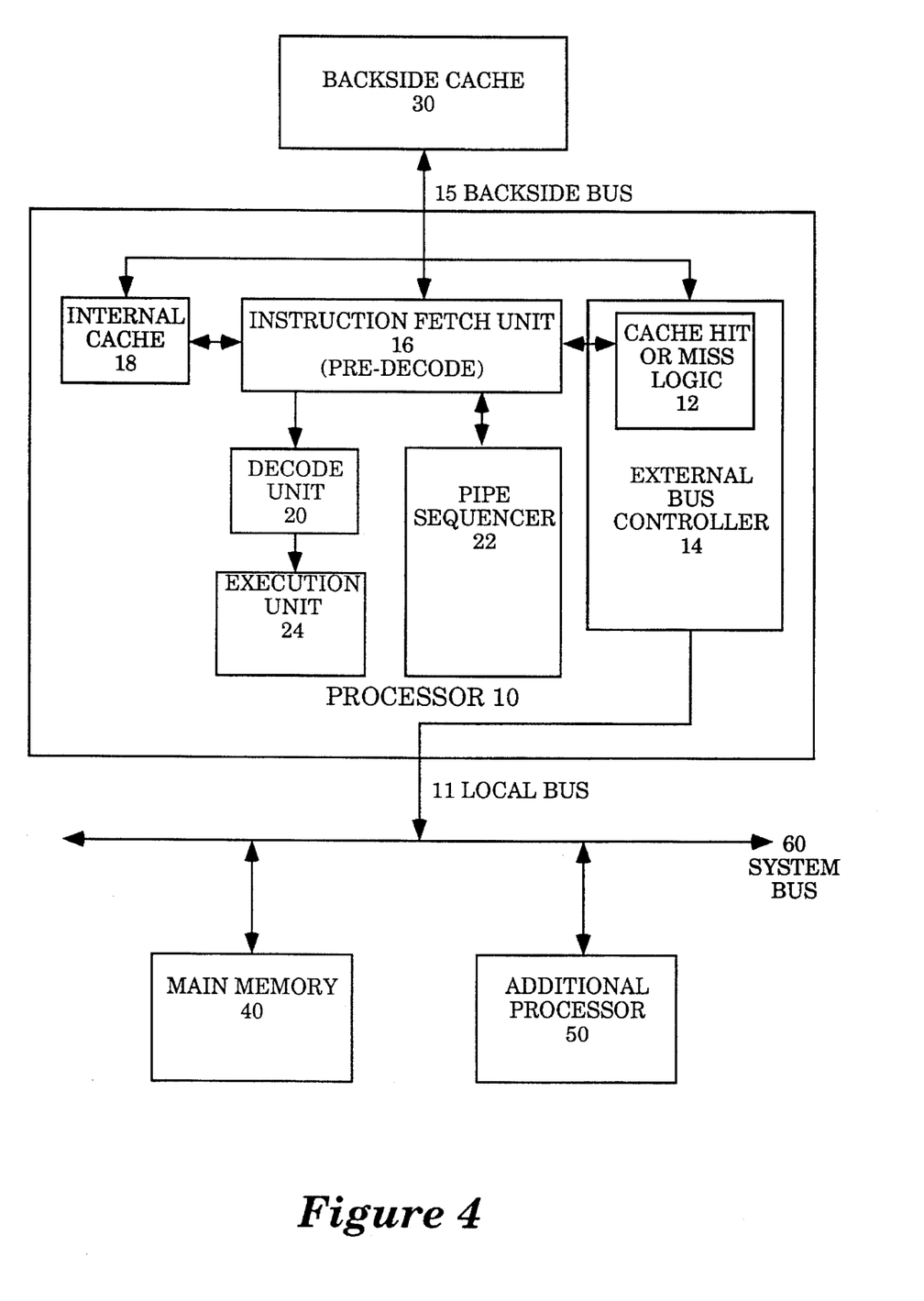
FIG. 4 illustrates in a more detailed diagram, the components within the microprocessor utilized in accordance with the present invention.

With reference now to FIG. 4, this figure illustrates, in greater detail, the functional blocks within processor 10 utilized in accordance with the present invention. These functional blocks include: an instruction fetch unit 16, an external bus controller (EBC) 14, an internal instruction cache 18, an instruction decode unit 20, a pipe sequencer 22, and an instruction execution unit 24. The instruction fetch unit 16 is responsible for fetching and pre-decoding instructions. The instruction fetch unit 16 feeds instructions to the instruction decode unit 20, which in turns, feeds decoded instructions to the instruction execution unit 24 for execution by the processor 10. Pipeline sequencer 22 provides the next instruction pointer to instruction fetch unit 16, and initiates the processor pipeline. The internal instruction cache 18 is a smaller, first level instruction cache disposed within the processor 10 chip which is advantageously used to store recently used instructions for particularly quick access. The external bus controller (EBC) 14 controls accesses to and from the backside bus 15 as well as the front side bus 11, and further incorporates the previously described backside cache hit or miss logic 12.

Figure 5A:
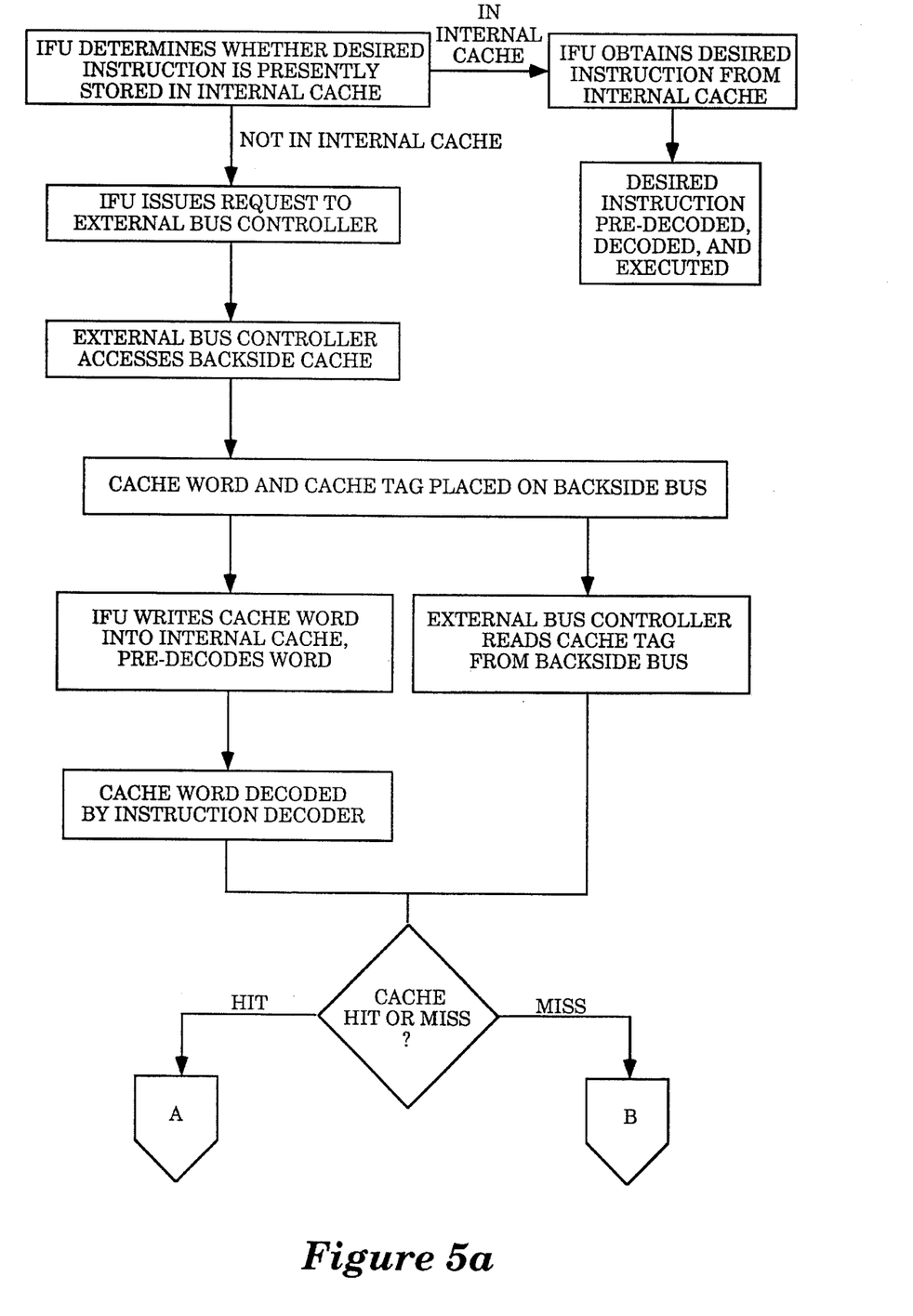
FIGS. 5A and 5B are contiguous figures showing, in a detailed flow chart, the present invention's method of operation.
Figure 5B:
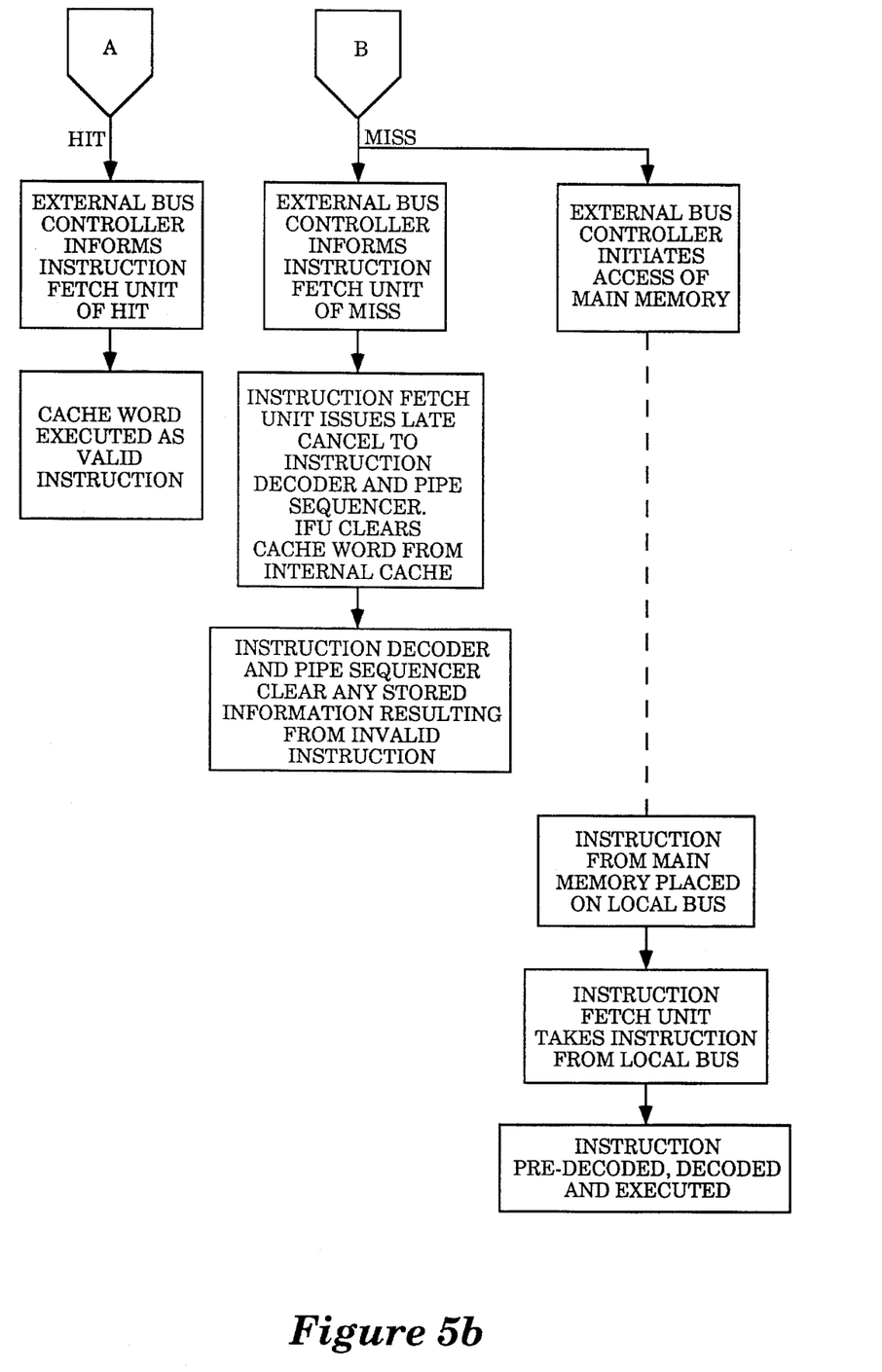

Referring now to FIGS. 5A and 5B, these figures illustrate in flow chart form the operation of the present invention in greater detail. The operation of the present invention will now be described through reference to FIGS. 4, 5A, and 5B. Initially, the instruction fetch unit 16 determines whether a desired instruction is presently stored in the internal cache 18. If the desired instruction is presently stored in the internal cache 18, the instruction fetch unit 16 obtains the instruction from the internal cache 18, pre-decodes the instruction, and couples the pre-decoded instruction to instruction decode unit 20. Instruction decode unit 20 then decodes the instruction into micro code and transfers the instruction to the execution unit 24 where it is executed.

If, on the other hand, the instruction is not presently stored in the internal cache 18, the instruction fetch unit (IFU) 16 issues a request for the desired instruction to the external bus controller (EBC) 14. In response, the external bus controller (EBC) 14 accesses the backside cache memory 30 through backside bus 15. In particular, external bus controller 14 causes the cache word and cache tag from the cache line to which the desired instruction is mapped in the external cache memory 30, to be coupled to the backside bus 15. The instruction fetch unit (IFU) 16 then reads the cache word from the backside bus 15, while the external bus controller 14 reads the cache tag from the backside bus 15. In concurrent fashion, the instruction fetch unit (IFU) 16 begins to process the cache word, and the external bus controller 14 provides the cache tag to the backside cache hit or miss logic 12 which begins to determine whether a backside cache hit or miss has occurred (i.e. whether the cache word is a valid instruction). While this validity determination is pending, the instruction fetch unit (IFU) 16 writes the cache word into the internal cache 18 and pre-decodes the cache word, preparing the cache word for decoding. The pre-decoded cache word is then coupled to the instruction decode unit 20.

Prior to actual execution of the cache word as an instruction, the backside cache hit or miss logic 12 determines whether a backside cache hit or miss has occurred (i.e. whether the cache word is valid). In the event of a cache hit, the external bus controller 14 couples a cache hit signal to the instruction fetch unit 16. In response to the cache hit signal, the instruction fetch unit 16 does not disrupt the processor pipeline, and the cache word proceeds normally, from the instruction decode unit 20, to the instruction execution unit 24.

On the other hand, if the backside cache hit or miss logic 12 determines that a cache miss has occurred (i.e. the cache word is invalid), the external bus controller 14 couples a cache miss signal to the instruction fetch unit 16, while concurrently, the external bus controller 14 initiates an access of main memory 40 for the desired instruction over local bus 11. In response to this cache miss signal, instruction fetch unit 16 issues a late cancel signal to both the instruction decode unit 20 and the pipe sequencer 22. The instruction fetch unit 16 further clears the cache word from the internal cache 18. The late cancel signal indicates to the instruction decode unit 20 and the pipe sequencer 22 that an invalid instruction has been placed in the processor pipeline. In response, the instruction decode unit 20 clears any stored information resulting from the invalid instruction, including any invalid op-code detection mechanism. Also in response to the late cancel signal, the pipe sequencer 22 clears any next instruction pointer information resulting from the invalid instruction and reissues the same instruction pointer which caused the late cancel. When the desired instruction is found in main memory 40, it is placed on the local bus 11. The instruction fetch unit 16 then reads the desired instruction from the local bus 11. The instruction fetch unit 16 then writes the instruction to the internal cache 18, pre-decodes the instruction, and couples the pre-decoded instruction to instruction decode unit 20. Instruction decode unit 20 then decodes the instruction into micro code, and the instruction is then executed by the execution unit 24.

Figure 6:
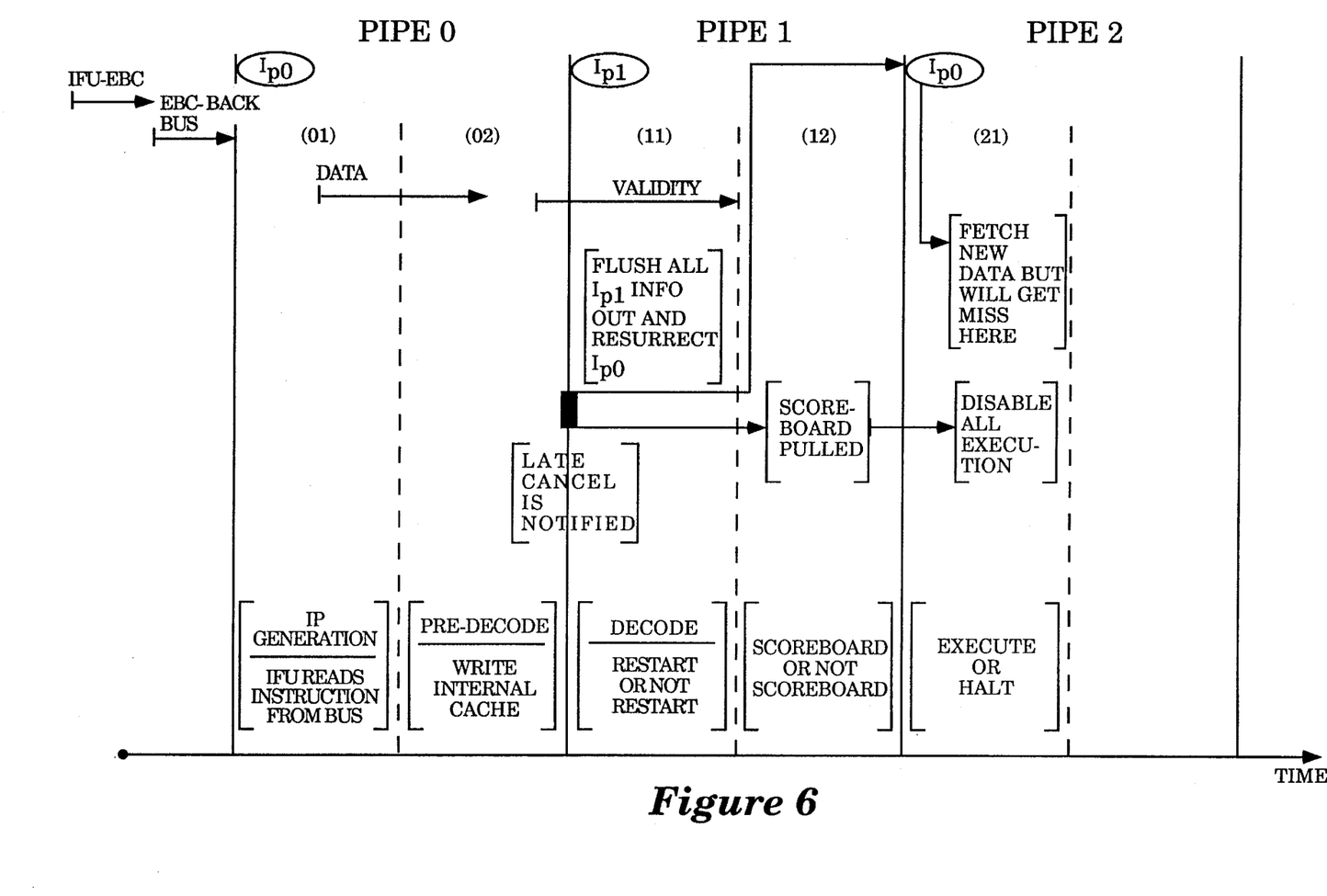
FIG. 6 illustrates the timing of events within the microprocessor.

With reference now to FIG. 6, this figure illustrates the timing of the previously described operations. In this figure, the solid vertical lines represent clock cycle boundaries, while the dashed lines represent the phase boundaries in a clock cycle. The solid vertical lines further correspond to pipelines within the microprocessor. Pipeline 0, pipeline 1, and pipeline 2 are illustrated, and are further broken down, into (01), (02), (11), and (12). (It is assumed in this figure that the IFU has initially determined that the desired instruction is not in the internal cache.)

As illustrated in FIG. 6, the IFU initially issues a request for the desired instruction to the EBC. In response, the EBC accesses the backside cache memory through the backside bus. The backside cache memory couples the cache word to the backside bus, such that it can be read by the IFU on the trailing edge of (01). It will be noted that while the cache word can be read by the IFU on the trailing edge of (01), the cache hit or miss (valid or invalid) determination is available at a later time, in (02). In accordance with the present invention, rather then wait until the trailing edge of (11) to begin the processing of the cache word (depending upon the results of the validity determination), the IFU begins the pre-decoding of the cache word in (02), preparing the cache word for decoding in (02) before a validity determination has been issued by the backside cache hit or miss logic. In addition, in (02), the IFU writes the cache word into the internal cache. In (11), the cache word is decoded into micro code, and the determination is made, based upon whether a cache hit or miss has occurred, whether to restart or not.

If a cache hit has occurred, a restart does not occur, and the cache word proceeds through (12) into execution in (21). On the other hand, if a cache miss has occurred, the processing of the cache word is canceled in (12) (a scoreboard signal is asserted to indicate that the instruction has not executed) before the cache word is executed in (21). Following this cancellation, the processor pipeline will be cleared of all information resulting from the invalid instruction, while concurrently, the desired instruction is sought from main memory. Accordingly, the processor is halted at this instruction, with no further pre-decoding or decoding of instructions until the EBC obtains the desired instruction from main memory and the desired instruction is placed in the pipeline in the location of the instruction found to be invalid.

It will be appreciated that by overlapping the cache hit or miss determination with the early stages of processing an instruction from cache memory, the present invention allows a microprocessor to execute programs faster. It will further be appreciated that in a typical microprocessor system, the amount of time required to clear any stored information from the processor pipeline will not be greater than the amount of time needed to access a desired instruction from main memory. To the extent this assumption is not true, a pre-condition can be applied to the operation of the present invention, namely, that the pipeline necessarily be cleared of information resulting from an invalid instruction before the instruction obtained from main memory is placed in the processor pipeline.

It is presently contemplated that the present invention be incorporated into a super-scalar processor, for example, one capable of executing up to three processor instructions in parallel. Thus, in the same processor pipeline, one might have three processor instructions. It will be appreciated that halting the processor pipeline following the detection of an invalid processor instruction would require that any additional parallel instructions also be halted in the processor pipeline. In addition, while the present invention finds particularly advantageous application when the backside cache is direct mapped, a four way set associative implementation can also be constructed. In such an implementation, four decoder sections would be used to simultaneously decode the four sections of the cache word, with the hit or miss determination being concurrently made.

While the present invention has been particularly described with reference to FIGS. 1 through 6, it should be understood that these figures are for illustration only and should not be taken as limitations upon the invention. It is further contemplated that many changes and modifications may be made to the invention, by one of ordinary skill in the art, without departing from the spirit and scope of the invention as disclosed herein.

We claim:

1. In a microprocessor system comprising a processor, a cache memory, and a main memory, a method for obtaining and processing an instruction comprising the steps of:

said processor coupling a request for an instruction to said cache memory;

said cache memory responsively coupling a cache word and cache tag to said processor;

said processor pre-decoding said cache word, while concurrently, determining whether said request to said cache memory has resulted in a cache hit or miss wherein said cache tag is utilized to make this determination;

said processor decoding said cache word;

if said request to said cache memory has resulted in a cache hit, said processor executing said cache word as a valid instruction;

if said request to said cache memory has resulted in a cache miss, said processor canceling the execution of said cache word as an invalid instruction and coupling a request for said instruction to said main memory.

2. The method for obtaining and processing an instruction as provided in claim 1, wherein said step of said processor canceling the execution of said cache word as an invalid instruction comprises eliminating from said processor results of pre-decoding and decoding of said cache word by said processor.

3. The method for obtaining and processing an instruction as provided in claim 1, wherein said processor utilizes cache hit or miss logic disposed in said processor to determine whether said request to said cache memory has resulted in a cache hit or miss.

4. In a microprocessor system comprising a processor, an external cache memory coupled to said processor through a backside bus, a main memory, wherein said processor includes an instruction fetch unit, an instruction decoder, an external bus controller, an internal cache memory, a pipe sequencer, an execution unit, and external cache hit or miss logic, a method for obtaining and processing a desired instruction comprising the steps of:

(a) said instruction fetch unit coupling a request for a desired instruction to said external bus controller;

(b) said external bus controller responsively accessing said external cache memory over said backside bus;

(c) said external cache memory responsively coupling a cache word and cache tag to said backside bus;

(d) said instruction fetch unit reading said cache word from said backside bus;

(e) said external bus controller reading said cache tag from said backside bus, said external bus controller providing said cache tag to said external cache hit or miss logic;

(f) said instruction fetch unit pre-decoding said cache word as an instruction, while concurrently, said cache hit or miss logic determines whether said cache word is a valid instruction;

(g) said instruction decoder decoding said cache word;

(h) if said cache hit or miss logic determines said cache word is a valid instruction, said execution unit executing said cache word as a valid instruction;

(i) if said cache hit or miss logic determines said cache word is an invalid instruction, said instruction fetch unit canceling the execution of said cache word as an invalid instruction;

(i.1) if said cache word is an invalid instruction said external bus controller coupling a request for said desired instruction to said main memory;

(i.2) if said cache word is an invalid instruction said main memory responsively coupling said desired instruction to said instruction fetch unit.

5. The method for obtaining and processing a desired instruction as provided in claim 4, further comprising the steps of:

said instruction fetch unit determining whether a desired instruction is in said internal cache;

if said desired instruction is in said internal cache, said instruction fetch unit obtaining said desired instruction from said internal cache, pre-decoding said desired instruction, and coupling said desired instruction to said instruction decode unit;

said instruction decode unit decoding said desired instruction and coupling said desired instruction to said execution unit;

said execution unit executing said desired instruction;

wherein said step of said instruction fetch unit coupling a request for said desired instruction to said external bus controller, and the steps taken in response to this step, occur if said desired instruction is not in said internal cache.

6. The method for obtaining and processing a desired instruction as provided in claim 4, wherein said step of said instruction fetch unit canceling the execution of said cache word as an invalid instruction includes:

coupling a late cancel signal to said instruction decoder and said pipe sequencer;

said instruction decoder responsively clearing any stored information resulting from said cache word;

said pipe sequencer responsively clearing any stored information resulting from said cache word.

7. A processor system comprising:

processor means;

external cache memory means coupled to said processor means;

main memory means coupled to said processor means;

wherein said processor means includes:

an instruction execution unit;

concurrent processing and determination means for processing a cache word provided to said processor means from said external cache memory means in response to a processor means request for a desired instruction coupled to said external cache memory means, while concurrently with said processing, determining whether said cache word is valid;

decoding means for further processing said cache word and preparing to couple said desired instruction to said instruction execution unit;

late cancel means for canceling the execution of said cache word in the event said concurrent processing and determination means determines that said cache word is invalid.

8. The processor system as provided in claim 7, wherein said concurrent processing and determination means includes external cache hit or miss logic.

9. The processor system as provided in claim 7, wherein said concurrent processing and determination means includes means for pre-decoding said cache word as an instruction.

10. The processor system as provided in claim 9, wherein said late cancel means includes means for canceling the execution of said cache word after said cache word has been pre-decoded by said means for pre-decoding and decoded by said decoding means.

11. The processor system as provided in claim 7, wherein said processor means further includes:

main memory request means for obtaining said desired instruction from said main memory in the event said late cancel means cancels the execution of said cache word.

12. A processor system comprising:

a processor;

an external cache memory coupled to said processor;

main memory coupled to said processor;

wherein said processor includes:

an instruction execution unit;

concurrent processing and determination means for processing a cache word provided to said processor from said external cache memory in response to a processor request for a desired instruction coupled to said external cache memory, while concurrently with said processing, determining whether said cache word is valid;

decoding means for further processing said cache word and preparing to couple said desired instruction to said instruction execution unit;

late cancel means for canceling the execution of said cache word in the event said concurrent processing and determination means determines that said cache word is invalid.

13. The processor system as provided in claim 12, wherein said concurrent processing and determination means includes external cache hit or miss logic.

14. The processor system as provided in claim 12, wherein said concurrent processing and determination means includes means for pre-decoding said cache word as an instruction.

15. The processor system as provided in claim 14, wherein said late cancel means includes means for canceling the execution of said cache word after said cache word has been pre-decoded by said means for pre-decoding and decoded by said decoding means.

16. The processor system as provided in claim 12, wherein said processor means further includes:

main memory request means for obtaining said desired instruction from said main memory in the event said late cancel means cancels the execution of said cache word.

17. A processor comprising:

bus means for coupling said processor to an external instruction cache;

an instruction execution unit;

concurrent processing and determination means for processing a cache word provided to said processor over said bus means from said external instruction cache memory, while concurrently with said processing, determining whether said cache word is valid;

decoding means for further processing said cache word and preparing to couple said desired instruction to said instruction execution unit;

selective late cancel means for canceling the execution of said cache word in the event said concurrent processing and determination means determines that said cache word is invalid and allowing said cache word to be executed in the event said concurrent processing and determination means determines that said cache word is valid.

18. A processor comprising:

an instruction fetch unit;

an instruction decode unit coupled to said instruction fetch unit capable of clearing stored information resulting from an instruction in response to a late cancel signal;

an execution unit coupled to said decode unit;

a pipe sequencer coupled to said instruction fetch unit;

a backside bus coupled to said instruction fetch unit;

external cache hit or miss logic coupled to said instruction fetch unit for concurrently determining whether a cache word provided over said backside bus to said instruction fetch unit from an external instruction cache is a valid instruction while said instruction fetch unit concurrently pre-decodes said cache word, said external cache hit or miss logic generating said late cancel signal if said cache word is not a valid instruction.

* * * * *